B. T. Roney.
Harvester Cutter.

No. 14777                                                Patented April 29. 1856.

Witnesses

Signed
B. T. Roney

UNITED STATES PATENT OFFICE.

BENJAMIN T. RONEY, OF PHILADELPHIA, PENNSYLVANIA.

IMPROVEMENT IN HARVESTER-CUTTERS.

Specification forming part of Letters Patent No. 14,777, dated April 29, 1856.

*To all whom it may concern:*

Be it known that I, BENJAMIN T. RONEY, of the city of Philadelphia and State of Pennsylvania, have invented certain Improvements in Cutters for Harvesters; and I do hereby declare that the following is a full, clear, and exact description of the same, reference being had to the accompanying drawings, and to the letters of reference marked thereon.

My invention relates to vibrating cutters for harvesters; and it consists of a series of levers having their fulcrums on pins screwed or otherwise bolted to a permanent bar, which I denominate the "fulcrum-bar." One end of each cutter-lever has a projection passing downward and fitting into an oblong slot in a bar which I denominate a "slotted bar," and which fits against the back edge of the fulcrum-bar. The other end of each lever is furnished with a pointed steel cutter having two sharp edges. These cutters are situated above and in close contiguity with similar cutters projecting from a bar which fits against the front of the fulcrum-bar. This bar, with its projecting cutters, I term the "cutter-bar." The slotted bar and cutter-bar are so connected as to move together, the fulcrum-bar acting as their guide. A reciprocating motion is imparted by any convenient driving apparatus to both slotted and cutter bar, which gives to the cutter-levers a vibrating motion, so that in operating the machine the upper and lower knives or cutters move in contrary directions. By this arrangement but one-half the motion requisite for the cutters of ordinary harvesters is required by my cutters. I construct the pins which form the fulcrums of the cutter-levers with convex heads, and for receiving the latter I form concave recesses above the holes in the cutter-levers. The convexity of the heads, however, does not correspond with the concavity of the recesses, the upper edge only of the former bearing on the upper edge of the latter. The holes, too, in the cutter-levers are somewhat larger than the diameter of the pins which form the fulcrums. The object of this arrangement is in order that the moment the stalks of grain or grass are presented to the combined action of the upper and lower cutters the levers will tilt over and bring the edges of their cutters in close contact with those of the lower cutters, this tilting of the levers taking place every time they reverse, and thereby operating on the grain or grass with much better cutting effect than ordinary vibrating cutters.

In order to enable others skilled in the art to make and use my invention, I will now proceed to describe its construction and operation.

Figure 1:
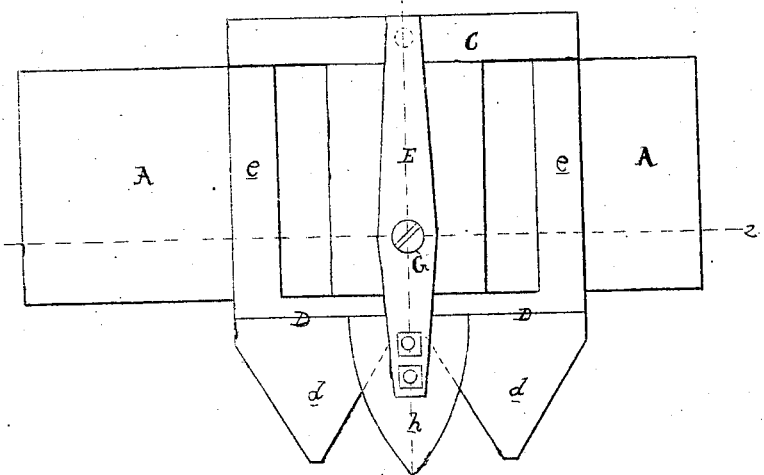
Figure 2:
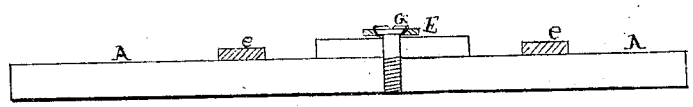
Figure 3:
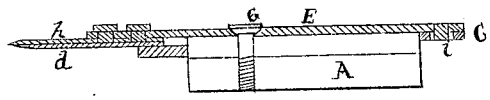
Figure 4:
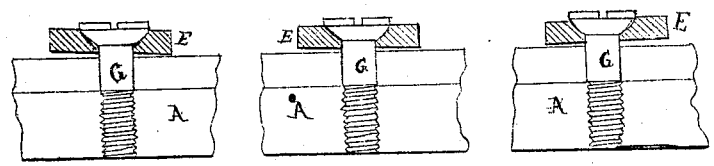
Figure 5:
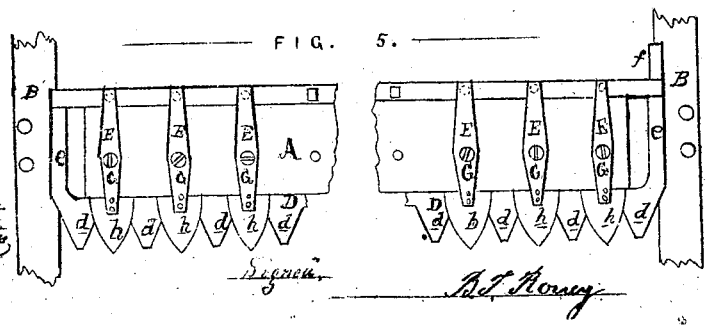

On reference to the drawings, which form a part of this specification, Figure 1 is a plan view, half-size, showing my improvements in cutters for harvesters; Fig. 2, a sectional view of the same on the line 1 2; Fig. 3, a transverse section on the line 3 4; Fig. 4, sectional views, full size, showing the manner in which the cutter-levers tilt as they operate; Fig. 5, a ground plan to a reduced scale, showing the general arrangement of cutting apparatus.

The same letters of reference allude to similar parts throughout the several views.

A is the fulcrum-bar, the opposite ends of which are attached to portions B and B' of the permanent frame of any harvester. Against the back of the raised portion of the bar A fits the slotted bar C, and against the front the cutter-bar D, which is furnished with a series of cutting-projections, *d d*. These two bars C and D are connected together at their opposite ends by the cross-pieces *e e*, so that both bars may move together, the fulcrum-bar forming the guide.

In the bar C are a series of oblong holes or slots, into which project pins *i*, (see Fig. 3,) attached to the under side and ends of the cutter-levers E. The latter are furnished at their opposite ends with knives *h h*, having sharp cutting-edges.

G G are screws or bolts, which, screwing into the bar A, form the fulcrums of the cutter-levers E E. The heads of the screws G are convex, as seen in Fig. 4, and the levers E have concave recesses. The convexity of the heads and concavity of the recesses, however, do not correspond or coincide with each other, but are so arranged that the upper edges of the heads bear against the upper edges of the recesses only. The holes in the cutter-levers, too, through which the bodies of the screws pass are somewhat larger in diameter than the screws.

It should be understood that the under faces of the knives *h h* and the upper faces of the projecting cutters are flat, the edges of the latter being beveled and reduced to a sharp cutting-edge from the under side and the edges of the former from the upper side.

A reciprocating motion is imparted to the bars C and D by connecting a rod actuated by a crank on any moving part of the machine to the projection $f$. This reciprocating motion of the connected bars imparts to the cutter-levers E a vibrating motion so that the knives $h\,h$ and projecting cutters $d\,d$, as the machine operates, move across each other in contrary directions.

It will be evident that by dividing the motion between the upper and lower cutters sufficient movement is obtained by half the motion required in the cutters of ordinary harvesters.

The peculiar form, already described, of the heads of the screws G in respect to that of the concave recesses in the cutter-levers E, as well as the fact of the holes in the latter being larger in diameter than the screws, cause the cutter-levers to tilt slightly over, as seen in Fig. 4, the moment stalks of grain or grass are presented to the combined action of the upper and lower cutters, and this tilting over causes the edges of the cutters to come into close and immediate contact with each other during the operation of cutting. This tilting over of the cutter-levers takes place first on one side and then on the other, (see Fig. 4,) the reversing tilt taking place simultaneously with the reversing of the levers, thus bringing first one edge and then the other of the upper knives hard against the edges of the lower cutters, and thereby producing a most decided cutting effect.

I am aware that vibrating knives or cutters for harvesters are well known, and in common use, and that such cutters have been arranged so as to produce what is known as the "shear-cut." I therefore do not desire to claim the use of vibrating cutters exclusively, but as an improvement upon the ordinary manner of arranging the same.

I claim—

The slotted bar C and cutter-bar D, as connected together by the cross-pieces $e\,e$, in combination with the cutter-levers E, their knives $h$, and projecting pins $i$, the whole being arranged in conjunction with the fulcrum-bar A, substantially in the manner and for the purpose set forth.

B. T. RONEY.

Witnesses:
  JOHN FINLAYSON, Jr.,
  WILLIAM E. WALTON.